US010965132B2

(12) United States Patent
Wagoner et al.

(10) Patent No.: US 10,965,132 B2
(45) Date of Patent: Mar. 30, 2021

(54) GROUNDING CIRCUIT FOR A BACKUP POWER SOURCE

(71) Applicant: General Electric Company, Schenectady, NY (US)

(72) Inventors: Robert Gregory Wagoner, Roanoke, VA (US); Jeffrey Alan Melius, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 16/131,643

(22) Filed: Sep. 14, 2018

(65) Prior Publication Data

US 2020/0091743 A1 Mar. 19, 2020

(51) Int. Cl.
*H02J 7/00* (2006.01)
*F03D 7/02* (2006.01)
*H02J 7/34* (2006.01)

(52) U.S. Cl.
CPC .......... *H02J 7/0031* (2013.01); *F03D 7/0224* (2013.01); *H02J 7/0068* (2013.01); *F05B 2230/80* (2013.01); *F05B 2240/221* (2013.01); *F05B 2260/74* (2013.01); *F05B 2260/79* (2013.01); *H02J 7/345* (2013.01)

(58) Field of Classification Search
CPC ........ H02J 7/0031; H02J 7/0068; H02J 7/345; H02J 3/00125; H02J 2310/18; H02J 9/06; H02J 11/00; H02J 9/04; H02J 7/0029; H02J 9/062; H02J 9/061; F03D 7/0224; F05B 2230/80; F05B 2240/221; F05B 2260/74; F05B 2260/79; H01G 11/08; H01G 11/10
See application file for complete search history.

(56) References Cited

U.S. PATENT DOCUMENTS

2010/0090663 A1   4/2010   Pappas et al.
2013/0028740 A1*  1/2013   Koehnke ............... F03D 7/0224
                                              416/147
(Continued)

FOREIGN PATENT DOCUMENTS

WO   WO 2016/174233 A1   11/2016
WO   WO2017/106410 A1     6/2017

OTHER PUBLICATIONS

European Search Report, dated Feb. 17, 2020 for EP Application No. 19197313.

*Primary Examiner* — Alex Torres-Rivera
(74) *Attorney, Agent, or Firm* — Dority & Manning, P.A.

(57) ABSTRACT

A grounding circuit for a backup power source used to power a pitch motor of a pitch system in a wind turbine is provided. The grounding circuit includes one or more switching elements configured to selectively couple the backup power source to a charging circuit based on a state of a first interface element. The grounding circuit further includes one or more switching elements configured to selectively couple the backup power source to ground based on a state of a second interface element. The grounding circuit includes at least one circuit protection device coupled between the backup power source and the charging circuit. When the backup power source is coupled to the charging circuit and subsequently coupled to ground, the at least one circuit protection device is configured to decouple the backup power source from the charging circuit.

18 Claims, 17 Drawing Sheets

(56) References Cited

U.S. PATENT DOCUMENTS

2014/0253138 A1* 9/2014 Ishii ................. H02S 50/10
                                                        324/509
2015/0008671 A1   1/2015 Palomares Rentero et al.
2017/0145989 A1   5/2017 Ritter et al.
2018/0372072 A1* 12/2018 Danielsen ............. F03D 7/042

* cited by examiner

GROUNDING CIRCUIT FOR A BACKUP POWER SOURCE

FIELD

The present disclosure relates generally to a grounding circuit for an backup power source used to power pitch motors of a pitch system in a wind turbine during adverse conditions.

BACKGROUND

Ultracapacitors can be used to power a load in a pitch drive system of a wind turbine system during adverse conditions, such as a grid fault. The ultracapacitors can be stored in a pitch cabinet of the wind turbine. In some instances, a user (e.g., maintenance personnel) may need to perform maintenance on the ultracapacitors or other components located within the cabinet. However, before the user can perform maintenance on the ultracapacitor or the other components in the cabinet, the ultracapacitors must be grounded.

BRIEF DESCRIPTION

Aspects and advantages of the invention will be set forth in part in the following description, or may be obvious from the description, or may be learned through practice of the invention.

In one aspect, a grounding circuit for a backup power source used to power a pitch motor of a pitch system in a wind turbine is provided. The grounding circuit includes one or more switching elements configured to selectively couple the backup power source to a charging circuit based on a state of a first interface element. The grounding circuit further includes one or more switching elements configured to selectively couple the backup power source to ground based on a state of a second interface element. The grounding circuit includes at least one circuit protection device coupled between the backup power source and the charging circuit. When the backup power source is coupled to the charging circuit and subsequently coupled to ground, the at least one circuit protection device is configured to decouple the backup power source from the charging circuit.

In another aspect, a method of grounding an ultracapacitor configured to operate a pitch motor of a pitch system in a wind turbine is provided. The method includes receiving, at a first interface element, a first input associated with decoupling the ultracapacitor from a charging circuit. In response to receiving the first input, the method includes decoupling, by one or more switching elements of a grounding circuit, the ultracapacitor from the charging circuit. The method further includes receiving, at a second interface element of the grounding circuit, a second input associated with coupling the ultracapacitor to ground. In response to receiving the second input, the method includes coupling, by one or more switching elements of the grounding circuit, the ultracapacitor to ground.

In yet another aspect, a wind turbine is provided. The wind turbine includes a pitch system comprising one or more pitch motors. The wind turbine includes an ultracapacitor configured to power the one or more pitch motors. The wind turbine includes a grounding circuit for the ultracapacitor. The grounding circuit includes one or more switching elements configured to selectively couple the ultracapacitor to a charging circuit based on a state of a first interface element. The grounding circuit further includes one or more switching elements configured to selectively couple the ultracapacitor to ground based on a state of a second interface element. The grounding circuit includes at least one circuit protection device coupled between the ultracapacitor and the charging circuit. When the ultracapacitor is coupled to the charging circuit and subsequently coupled to ground, the at least one circuit protection device is configured to decouple the ultracapacitor from the charging circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
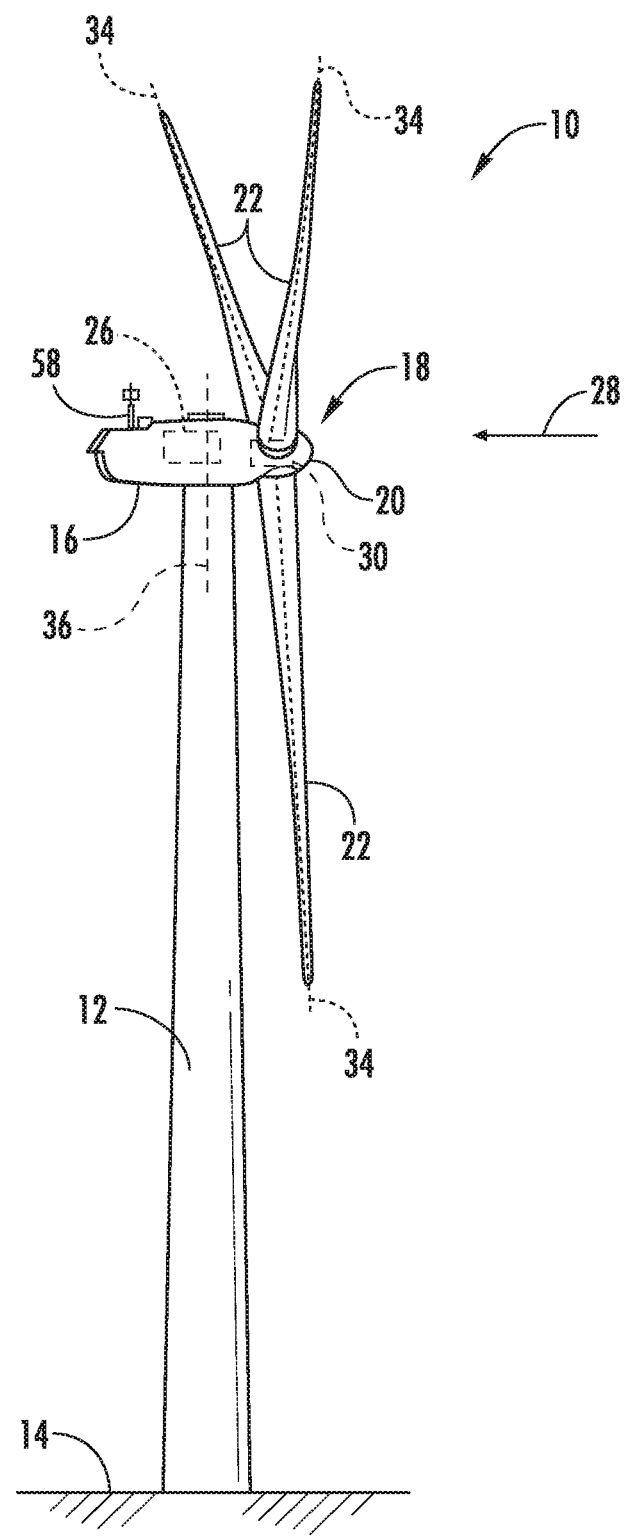
FIG. 1 depicts a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a grounding circuit for a backup power source (e.g., ultracapacitor) used to power induction motors of a pitch system in a wind turbine. The grounding circuit can include one or more switching elements (e.g., contactors) configured to selectively couple the backup power source to a charging circuit based on a state of a first interface element (e.g., switch, lever, pushbutton, control panel, etc.). For instance, when the first interface element is in a first state, the one or more switching elements can move to a closed position to couple the backup power source to the charging circuit. When the first interface element is in a second state, the one or more switching elements move to an open position to decouple the backup power source from the charging circuit.

The grounding circuit can further include one or more switching elements (e.g., contactors) configured to selectively couple the backup power source to ground based on a state of a second interface element (e.g., switch, lever, pushbutton, control panel, etc.). When the second interface element is in a first state, the one or more switching elements move to an open position to decouple the backup power source from ground. In contrast, when the second interface element is in a second state, the one or more switching elements move to a closed position to couple the ultracapacitor to ground. As will be discussed below in more detail, a user (e.g., maintenance personnel) can operate the first and second interface elements in a predefined sequence to properly ground the backup power source.

In order to operate the first and second interface elements in the predefined sequence, the first interface element must be placed in the second state prior to placing the second interface element in the second state. In this manner, the backup power source can be decoupled from the charging circuit before being coupled to ground. When the first and second interface elements are operated in the predefined sequence, the backup power source can, in some embodiments, discharge through a resistor of the grounding circuit. More specifically, the resistor can be coupled to ground and via the one or more switching elements configured to selectively couple the backup power source to ground.

Furthermore, even if the user operates the first and second interface elements out of sequence (e.g., placing second interface element in the second state prior to placing first interface element in the second state), the grounding circuit includes a circuit protection device (e.g., a fuse) coupled between the charging circuit and the one or more switching elements configured to selectively couple the ultracapacitor to the grounding circuit. In this manner, the current associated with coupling the backup power source to ground must flow through the circuit protection device. In example embodiments, the circuit protection device can blow when the first and second interface elements are operated out of sequence and, in the process, create an open circuit. In this manner, the circuit protection device can prevent damage to the charging circuit due to the first and second interface elements being operated out of sequence.

Aspects of the present disclosure are discussed with reference to a grounding circuit for a backup power source (e.g., ultracapacitor) used to power a pitch system in a wind turbine. Those of ordinary skill in the art, using the disclosures provided herein, will understand that aspects of the present embodiments can be used with other applications without deviating from the scope of the present disclosure.

Referring now to the drawings, FIG. 1 illustrates a perspective view of one embodiment of a wind turbine 10 according to example aspects of the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
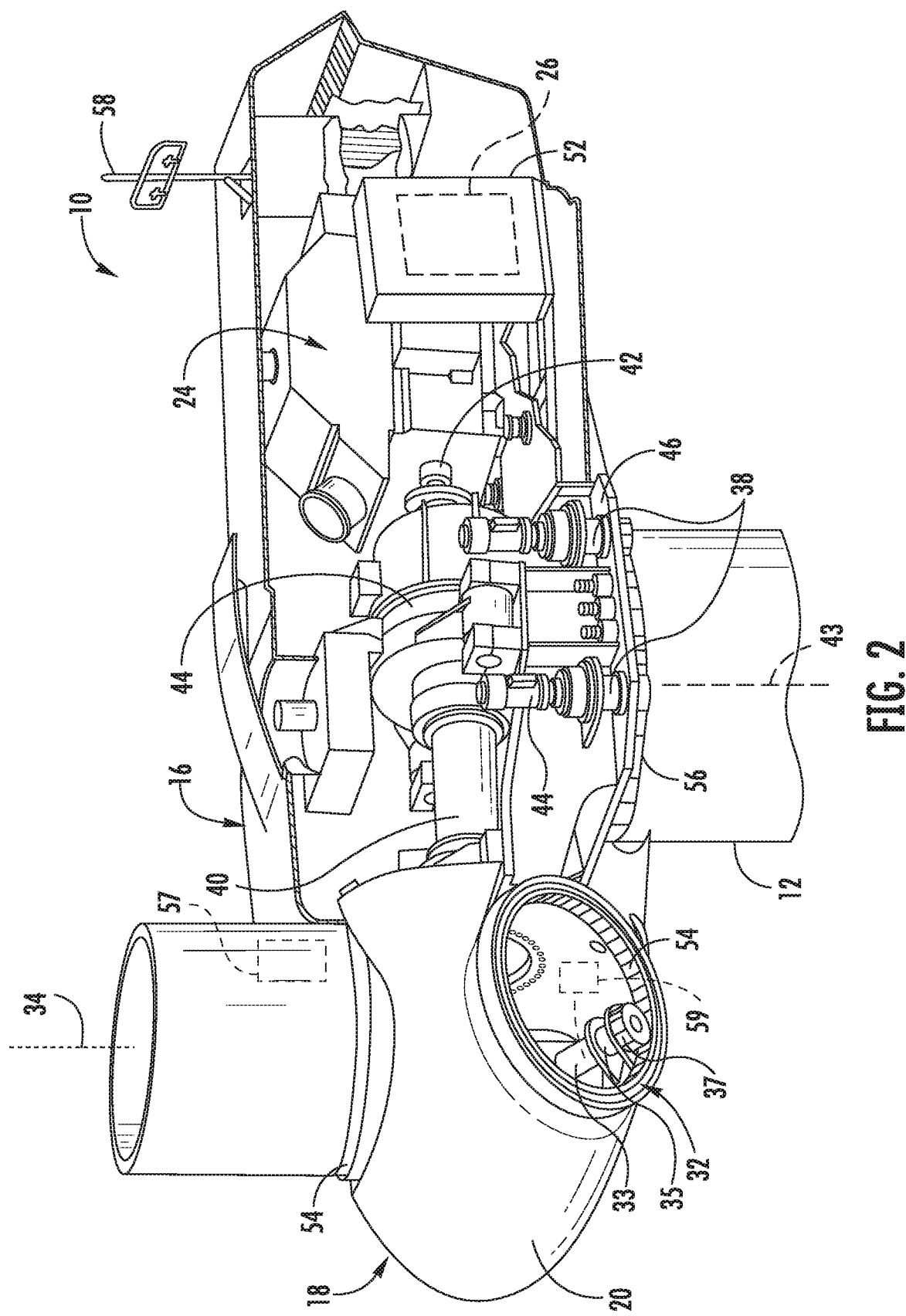
FIG. 2 depicts a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. The generator 24 may be coupled to the rotor 18 of the wind turbine 10. In this manner, rotational energy generated by the rotor 18 can be converted into electrical power. In example embodiments, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34. Similarly, the wind turbine 10 may include one or more yaw drive mechanisms 38 communicatively coupled to the turbine controller 26, with each yaw drive mechanism(s) 38 being configured to change the angle of the nacelle 16 relative to the wind (e.g., by engaging a yaw bearing 56 of the wind turbine 10).

Further, the turbine controller 26 may also be communicatively coupled to each pitch adjustment mechanism 32 of the wind turbine 10 (one of which is shown) through a separate or integral pitch controller 30 (FIG. 1) for controlling and/or altering the pitch angle of the rotor blades 22 (i.e., an angle that determines a perspective of the rotor blades 22 with respect to the direction 28 of the wind).

In addition, as shown in FIG. 2, one or more sensors 57, 58, 59 may be provided on the wind turbine 10. More specifically, as shown, a blade sensor 57 may be configured with one or more of the rotor blades 22 to monitor the rotor blades 22. Further, as shown, a wind sensor 58 may be provided on the wind turbine 10. For example, the wind sensor 58 may be a wind vane, an anemometer, a LIDAR sensor, or another suitable sensor that measures wind speed and/or direction. In addition, a pitch sensor 59 may be configured with each of the pitch drive mechanism(s) 32, e.g. with one or more ultracapacitors associated with the pitch drive motors 33 thereof, which will be discussed in more detail below. As such, the sensors 57, 58, 59 may further be in communication with the pitch controller 30, and may provide related information to the pitch controller 30.

Figure 3:
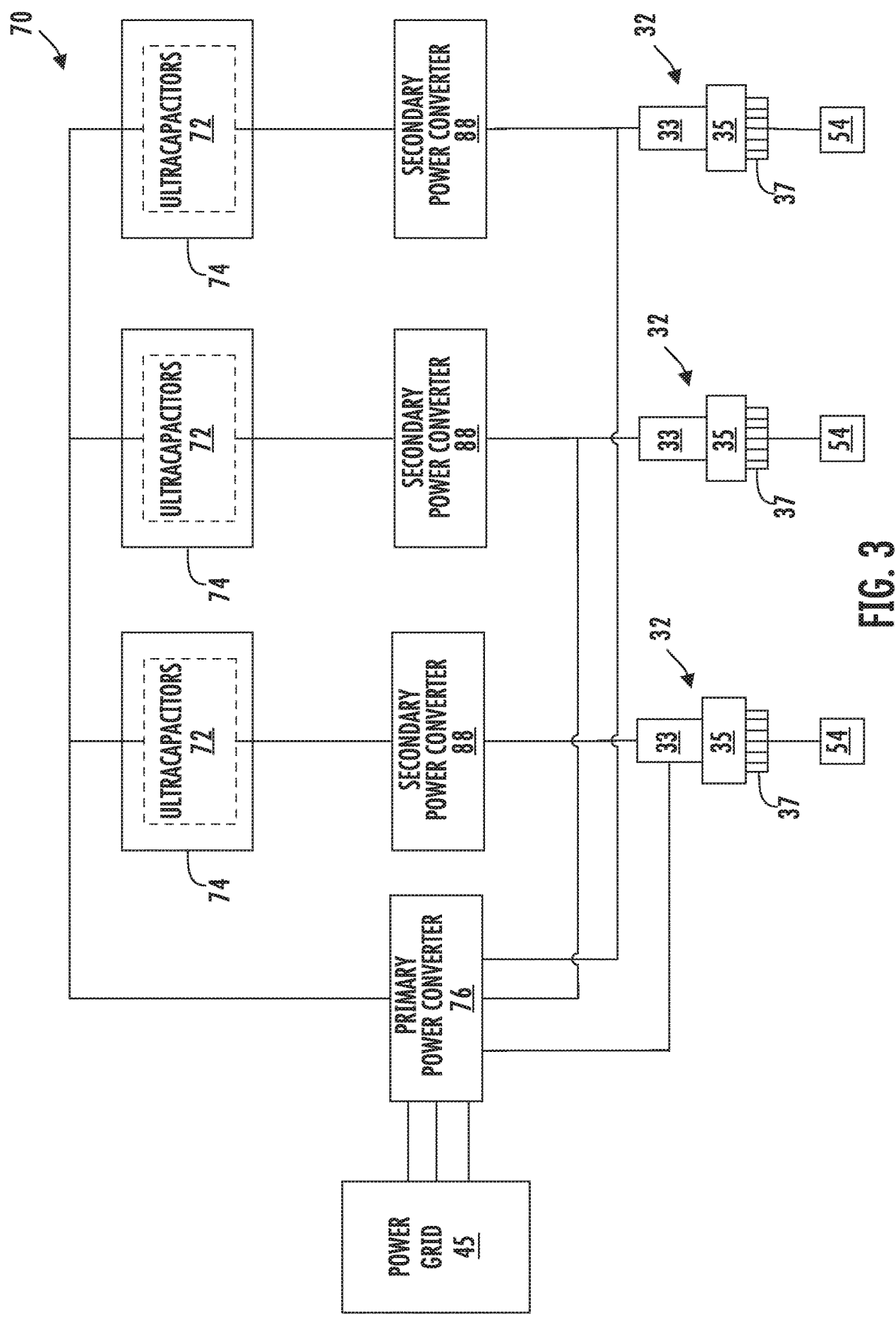
FIG. 3 depicts a schematic diagram of one embodiment of a pitch system of a wind turbine according to the present disclosure.

Referring now to FIG. 3, a schematic diagram of one embodiment of a pitch system 70 for the wind turbine 10 (FIG. 1) is provided. More specifically, as shown, the pitch system 70 includes a plurality of pitch drive mechanisms 32, i.e. one for each pitch axis 34 (FIG. 2). Further, as shown, each of the pitch drive mechanisms 32 may be communicatively coupled to a power grid 45 as well as a ultracapacitors 72. More specifically, as shown, ultracapacitors 72 associated with each pitch drive mechanism 32 can be stored in a cabinet 74. In some embodiments, the cabinet 74 can be a thermally isolated container.

During normal operation of the wind turbine 10, a primary power converter 76 of the wind turbine 10 (FIG. 1) receives alternating current (AC) power from the power grid 45 and converts the AC power to AC power suitable for driving the pitch drive motors 33 (e.g., AC motors) of each pitch drive mechanism 32. Additionally, the primary power converter 76 can convert AC power received from the power grid 45 into direct current (DC) power suitable for charging the bank ultracapacitors 72. In some instances (e.g., adverse grid event or grid loss), the pitch drive motors 33 may be driven (e.g., powered) by the ultracapacitors 72.

Figure 4:
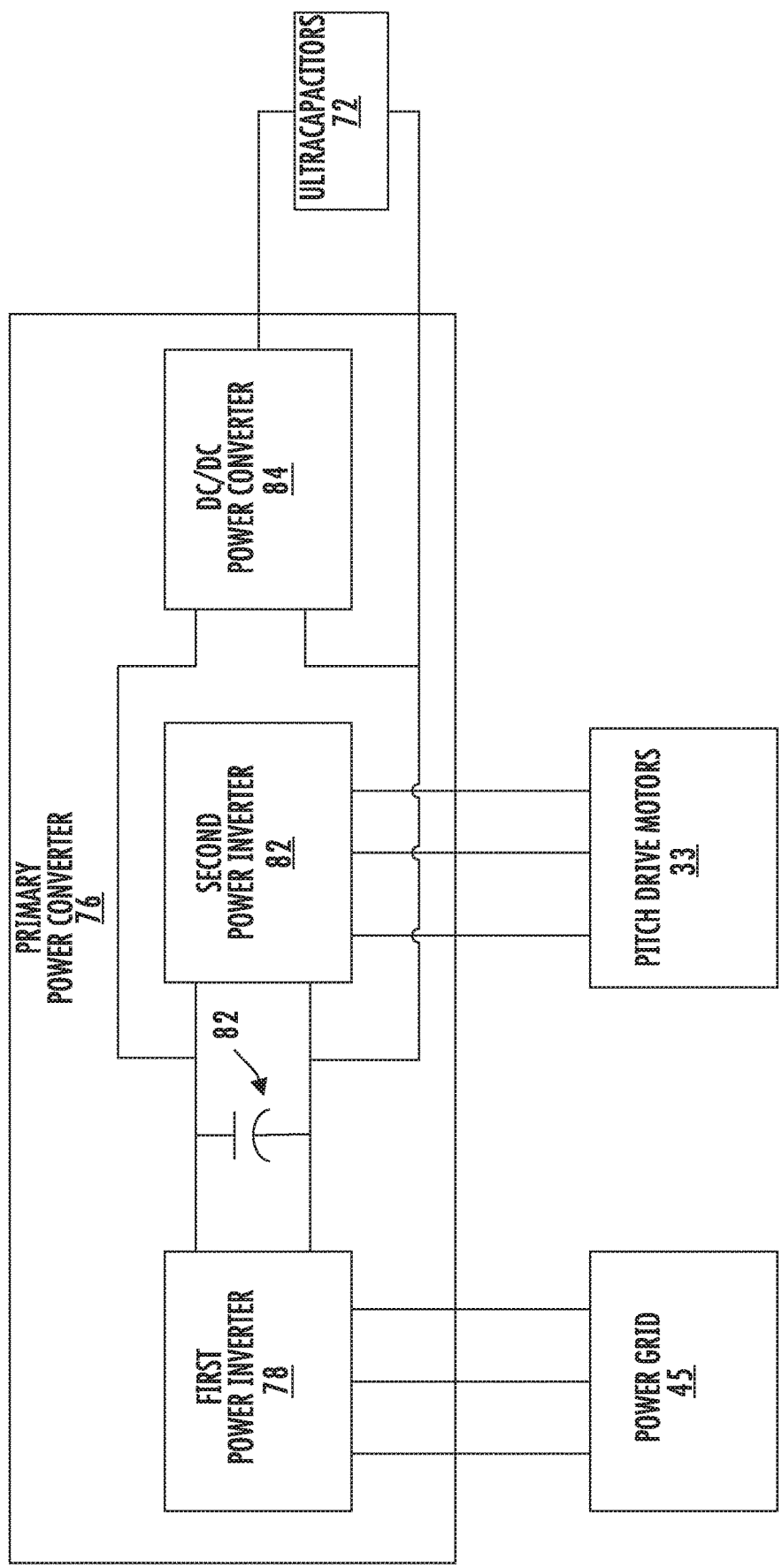
FIG. 4 depicts a schematic diagram of one embodiment of a primary power converter of a wind turbine according to example embodiments of the present disclosure.

FIG. 4 depicts an example embodiment of the primary power converter 76 according to example embodiments of the present disclosure. The primary power converter 76 can include an AC rectifier 78 configured to receive AC power from the power grid 45 at a first AC voltage and convert the first AC voltage to DC power at a first DC voltage. Additionally, the AC rectifier 78 can be coupled to a power inverter 80 of the primary power converter 76. More specifically, the first AC rectifier 78 can be coupled to the power inverter 80 via one or more conductors (e.g., wires). In this manner, the output (e.g., DC power at first DC voltage) of the AC rectifier 78 can be provided to the power inverter 80. As shown, the primary power converter 76 can include one or more capacitors 82 (e.g., electrolytic capacitors) coupled between the output of the AC rectifier 78 and the input of the power inverter 80. In example embodiments, the one or more capacitors 82 can be configured to reduce or eliminate noise associated with the DC power the AC rectifier 78 provides to the power inverter 80.

The power inverter 80 can be configured to convert the DC power at the first DC voltage to AC power at a second AC voltage. In example embodiments, the second AC voltage can be different (e.g., greater than or less than) than the first AC voltage associated with the AC power the AC rectifier 78 receives from the power grid 45. As shown, the output (e.g., AC power at the second AC voltage) can be provided to the pitch drive motor 33 of the pitch drive mechanisms 32 (FIG. 4).

The primary power converter 76 can include a DC to DC power converter 84. As shown, the power converter 84 can be coupled to one or more input terminals (e.g., leads) associated with the second power inverter 80. In this manner, the power converter 84 can receive the DC power at the first DC voltage. Additionally, the power converter 84 can be coupled to the ultracapacitors 72. In example embodiments, the power converter 84 can convert the DC power at the first DC voltage to DC power at a second DC voltage that is suitable for charging the ultracapacitors 72. It should be appreciated that the second DC voltage can be different (e.g., less than or greater than) than the first DC voltage.

Figure 5:
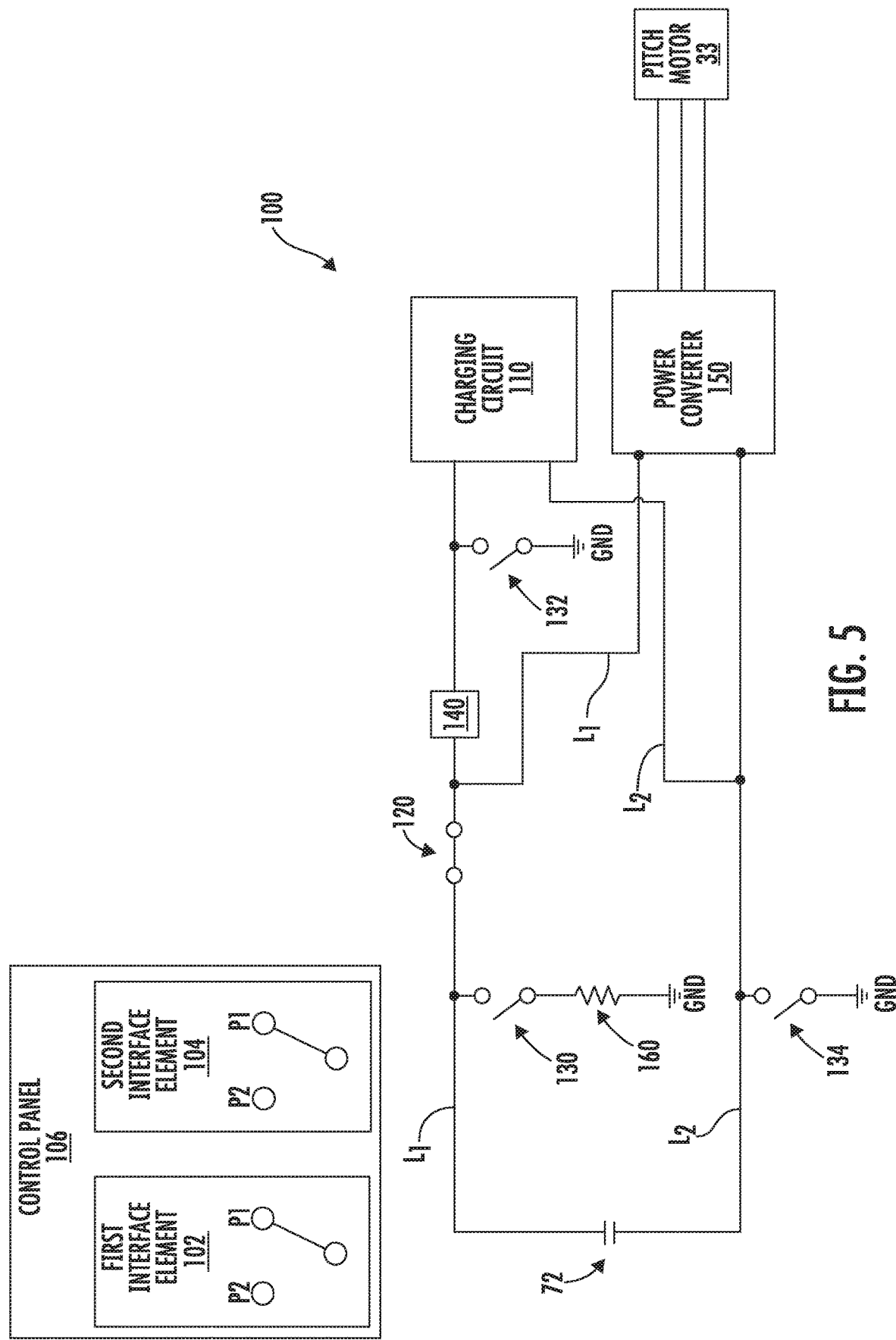
FIG. 5 depicts a grounding circuit for an ultracapacitor according to example embodiments of the present disclosure.
Figure 6:
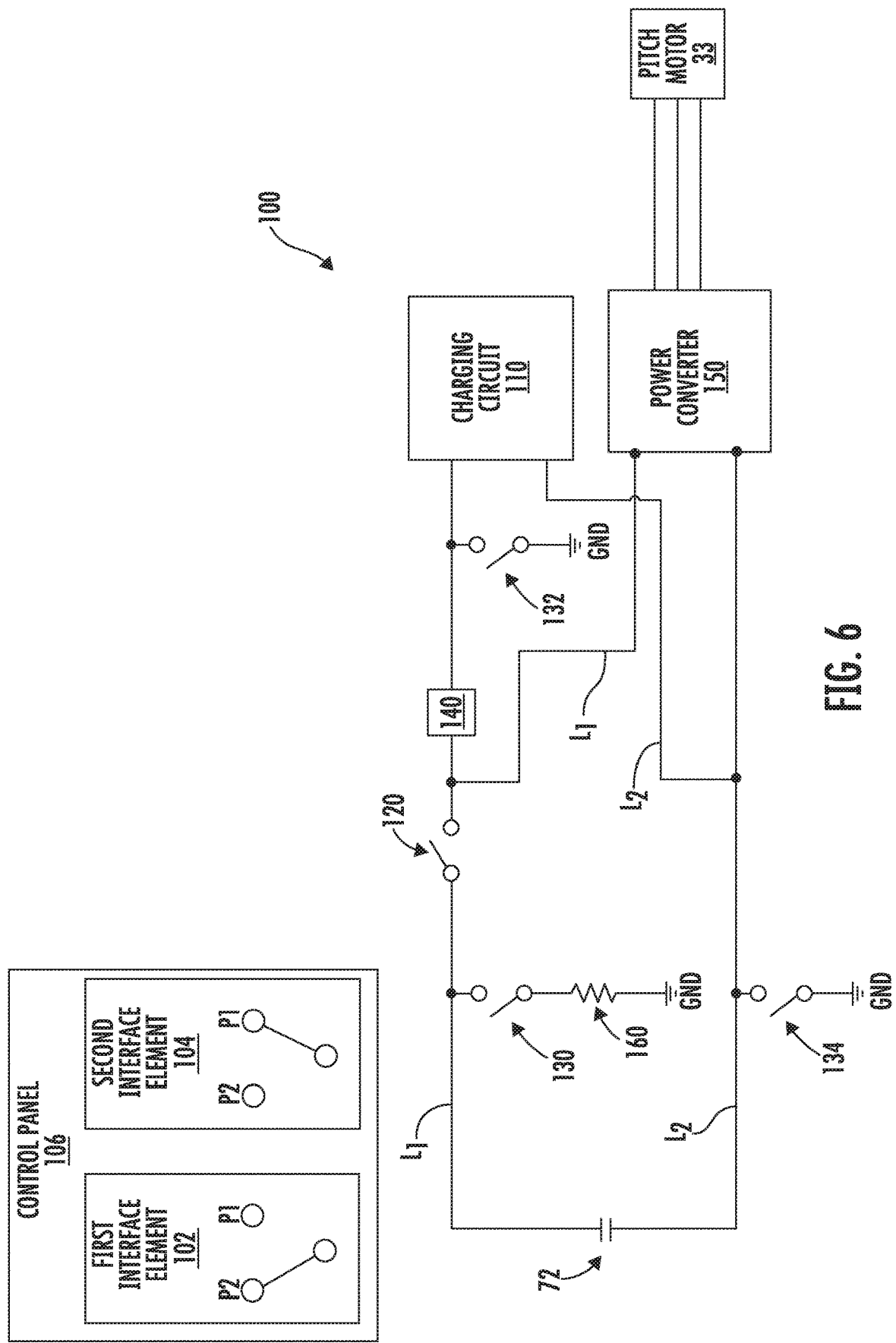
FIG. 6 depicts the grounding circuit of FIG. 5 when a first interface element is in a second state and a second interface element is in a first state.
Figure 7:
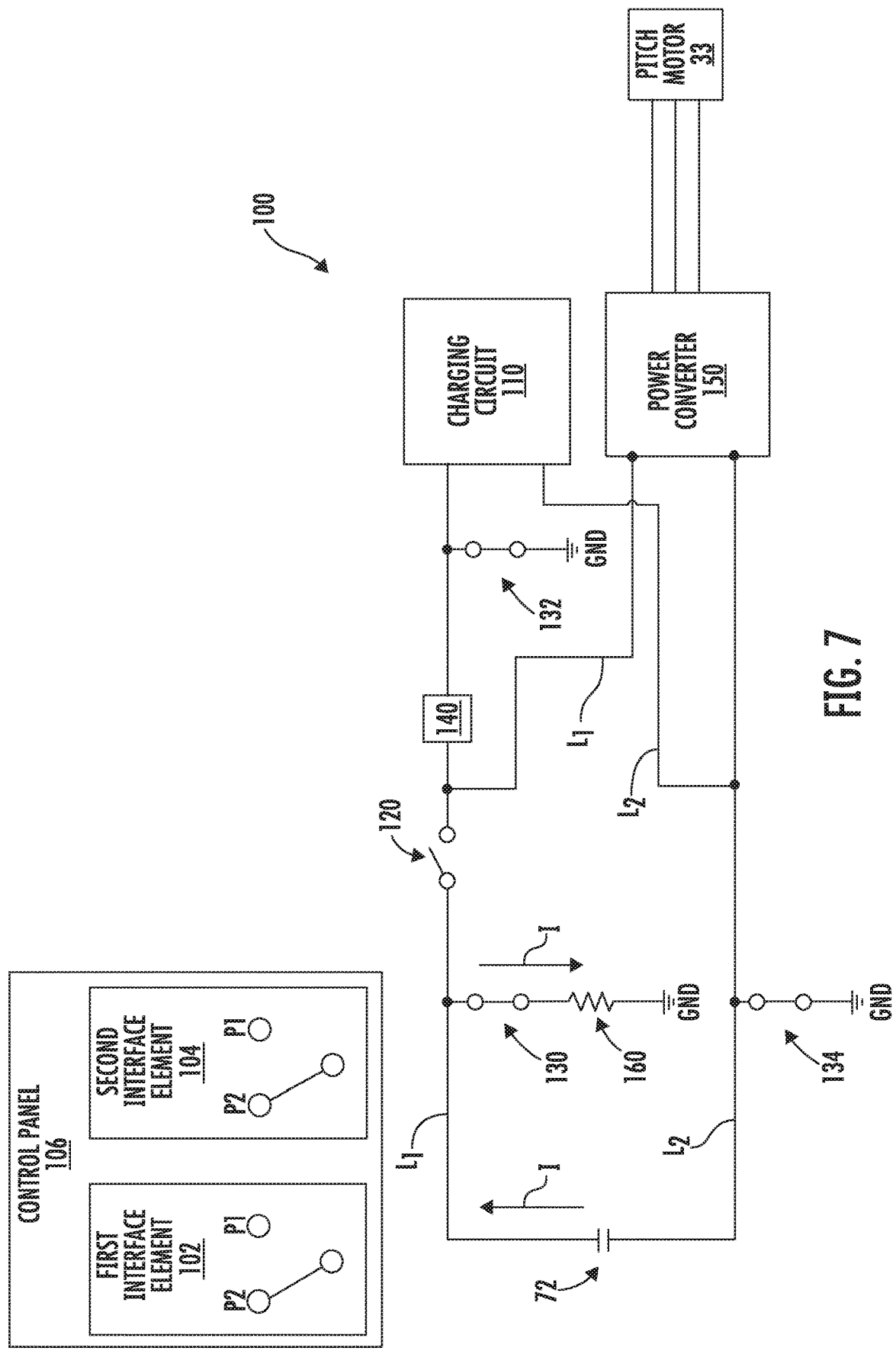
FIG. 7 depicts the grounding circuit of FIG. 5 when the first interface element is in a second state and the second interface element is in a second state according to example embodiments of the present disclosure.

Referring now to FIGS. 5-7, a grounding circuit 100 for a backup power source for a pitch motor 33 of the pitch system 70 (FIG. 3) in the wind turbine 10 (FIG. 1) is provided according to example embodiments. As shown, the backup power source for the pitch motor 33 comprises the ultracapacitor 72 discussed above with reference to FIGS. 3 and 4. It should be appreciated, however, that the backup power source can include any suitable power source configured to power the pitch motor 33 when the primary power converter 76 (FIGS. 3 and 4) offline.

The grounding circuit 100 can, as will be discussed below in more detail, operate based on a state of a first interface element 102 and a second interface element 104. In example embodiments, the first interface element 102 and the second interface element 104 can be input devices (e.g., switches, levers, touchscreen, pushbutton, etc.) configured to transition between at least a first state or positon P1 and a second state or position P2 in response to user-input. More specifically, the first and second interface elements 102, 104 can be associated with a control panel 106 (e.g., electrical panel) of the wind turbine 10 (FIG. 1). It should be appreciated, however, that the first and second interface elements 102, 104 can include any suitable input device. It should also be appreciated that the first and second interface elements 102, 104 can be located at any suitable location on the wind turbine 10 (FIG. 1).

In example embodiments, the grounding circuit 100 includes a switching element 120 coupled to a first leg $L_1$ of the ultracapacitor 72 and configured to selectively couple the ultracapacitor 72 to a charging circuit 110 based, at least in part, on a state (e.g., first state P1 or second state P2) of the first interface element 102. More specifically, the switching element 120 can move between a closed position (FIG. 5) and an open position (FIG. 6) to selectively couple the ultracapacitor 72 to the charging circuit 110 which, in some embodiments, is the DC/DC power converter 84 (FIG. 4) of the primary power converter 76. Alternatively and/or additionally, the switching element 120 can move between the closed position and the open position to selectively couple the ultracapacitor 72 to a power converter 150 of the wind turbine 10 (FIG. 1). In example embodiments, the power converter 150 can be the secondary power converter 88 (FIG. 3) of the pitch system 70 (FIG. 3).

When the first interface element 102 is in the first state P1, the fifth switching element 120 moves to the closed position to couple the ultracapacitor 72 (e.g., first leg $L_1$) to the charging circuit 110 and the power converter 150. When the first interface element 102 is in the second state P2, the fifth switching element 120 moves to the open position (FIG. 6) to decouple the ultracapacitor 72 from the charging circuit 110 and the power converter 150. In this manner, the ultracapacitor 72 can be selectively coupled to the charging circuit 110 and the power converter 150 based, at least in part, on the state (e.g., first state P1 or second state P2) of the first interface element 102.

In example embodiments, the grounding circuit 100 can include one or more switching elements configured to selectively couple the ultracapacitor 72 to ground GND. As shown, the grounding circuit 100 can include a first switching element 130, second switching element 132, and a third switching element 134. It should be appreciated, however, that the grounding circuit 100 can include more or fewer switching elements configured to selectively couple the ultracapacitor 72 to ground GND.

Figure 8:
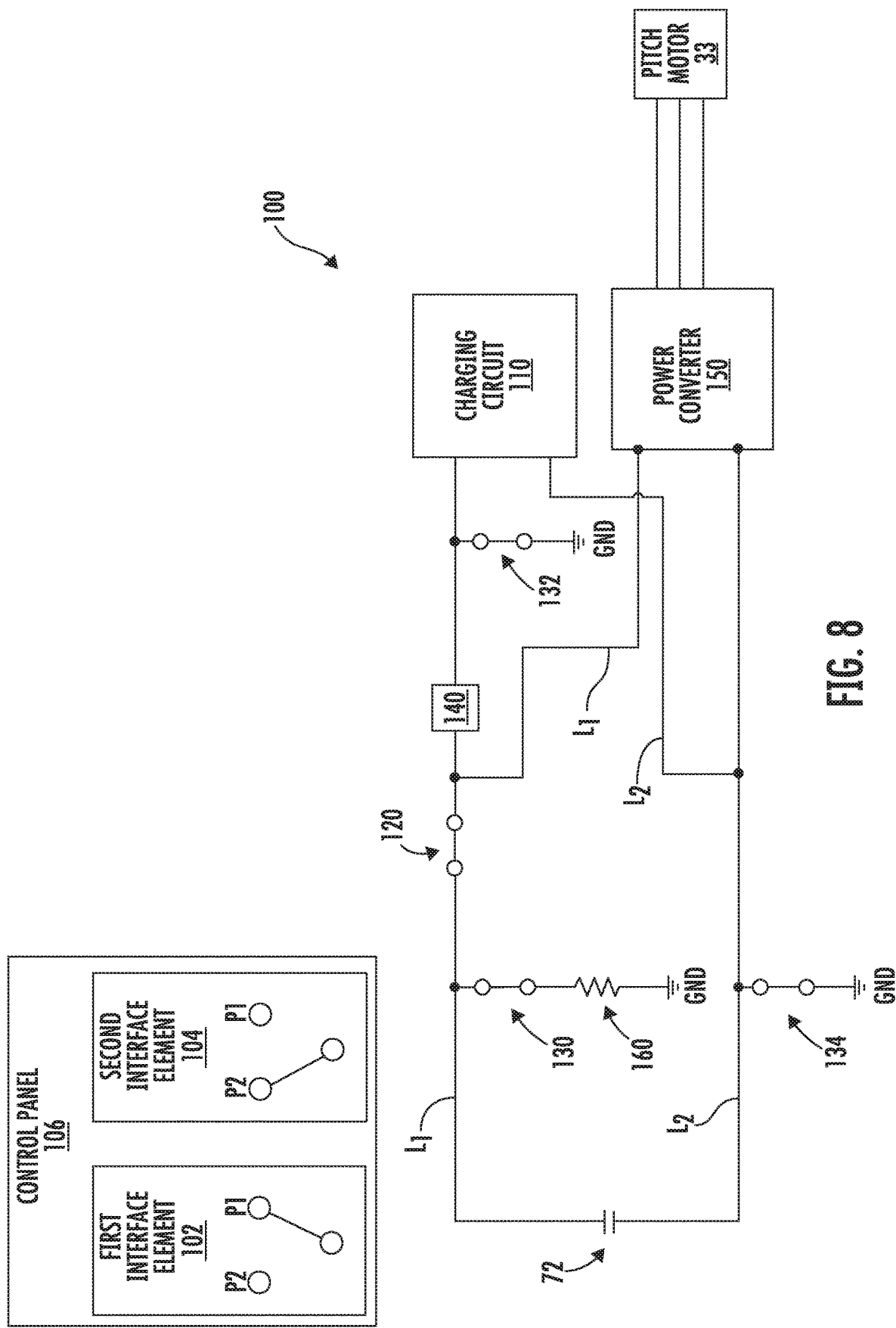
FIG. 8 depicts the grounding circuit of FIG. 5 when the first interface element is in the first state and the second interface element is in the second state according to example embodiments of the present disclosure.
Figure 9:
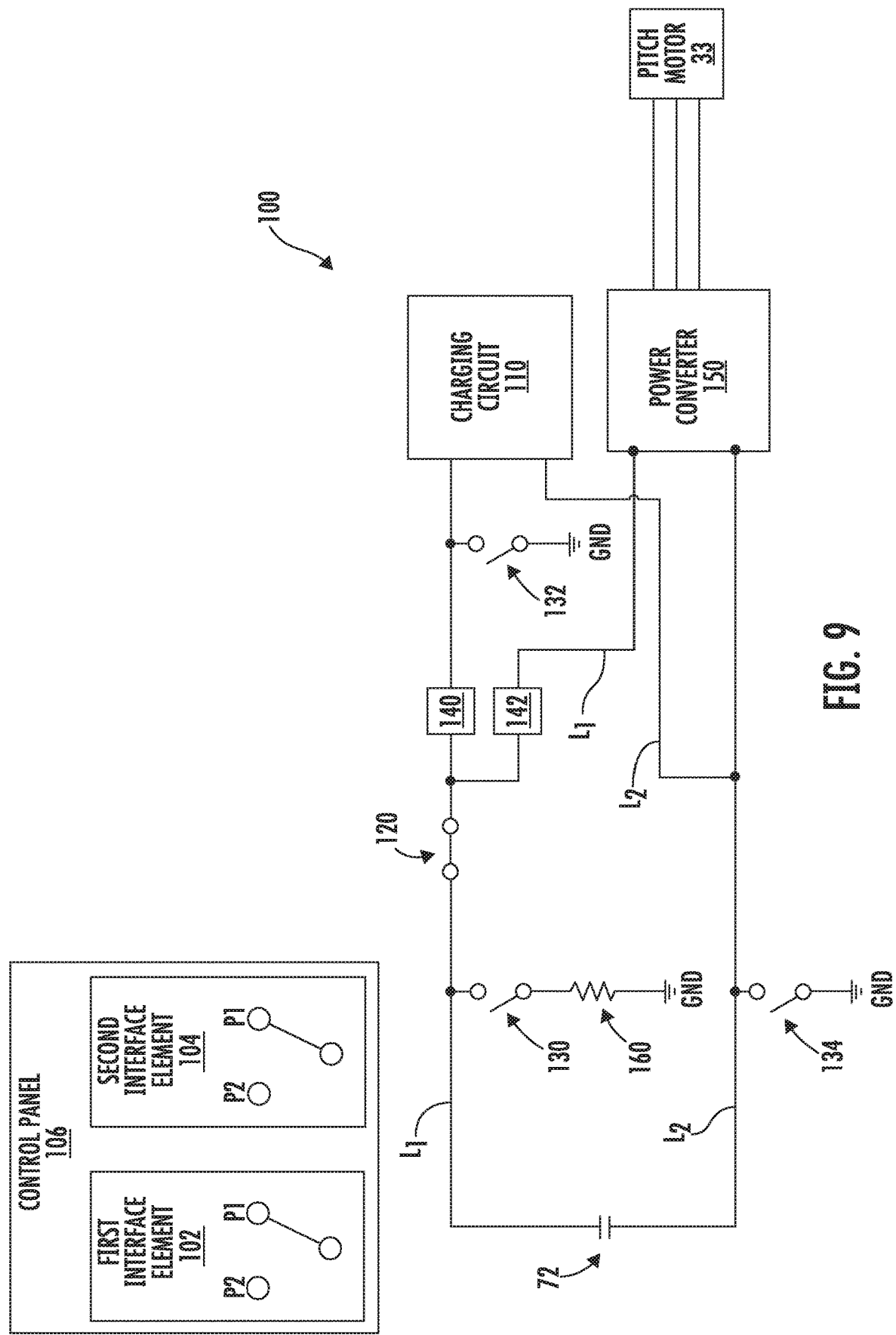
FIG. 9 depicts another grounding circuit for an ultracapacitor according to example embodiments of the present disclosure.
Figure 10:
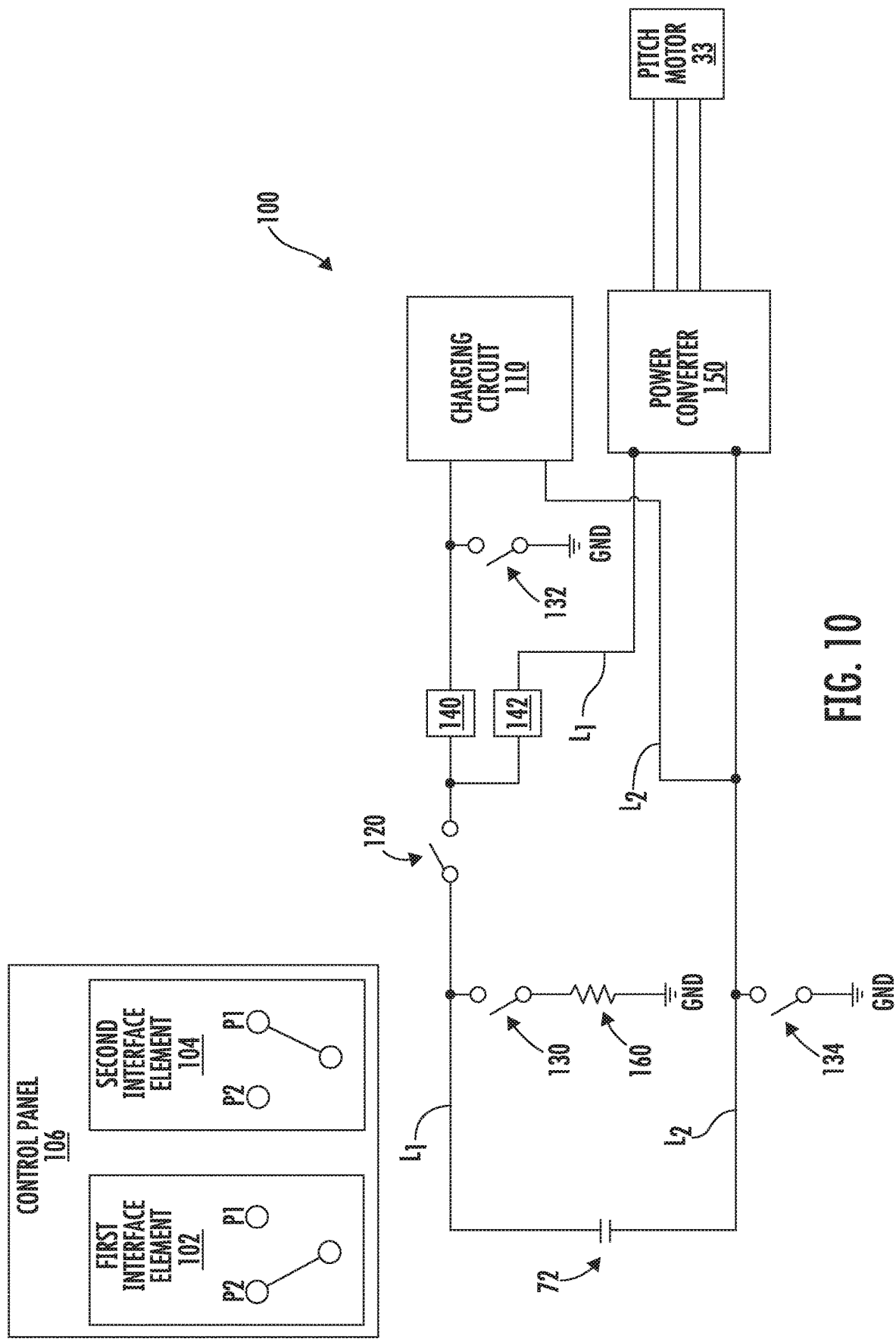
FIG. 10 depicts the grounding circuit of FIG. 9 when a first interface element is in a second state and a second interface element is in a first state according to example embodiments of the present disclosure.
Figure 11:
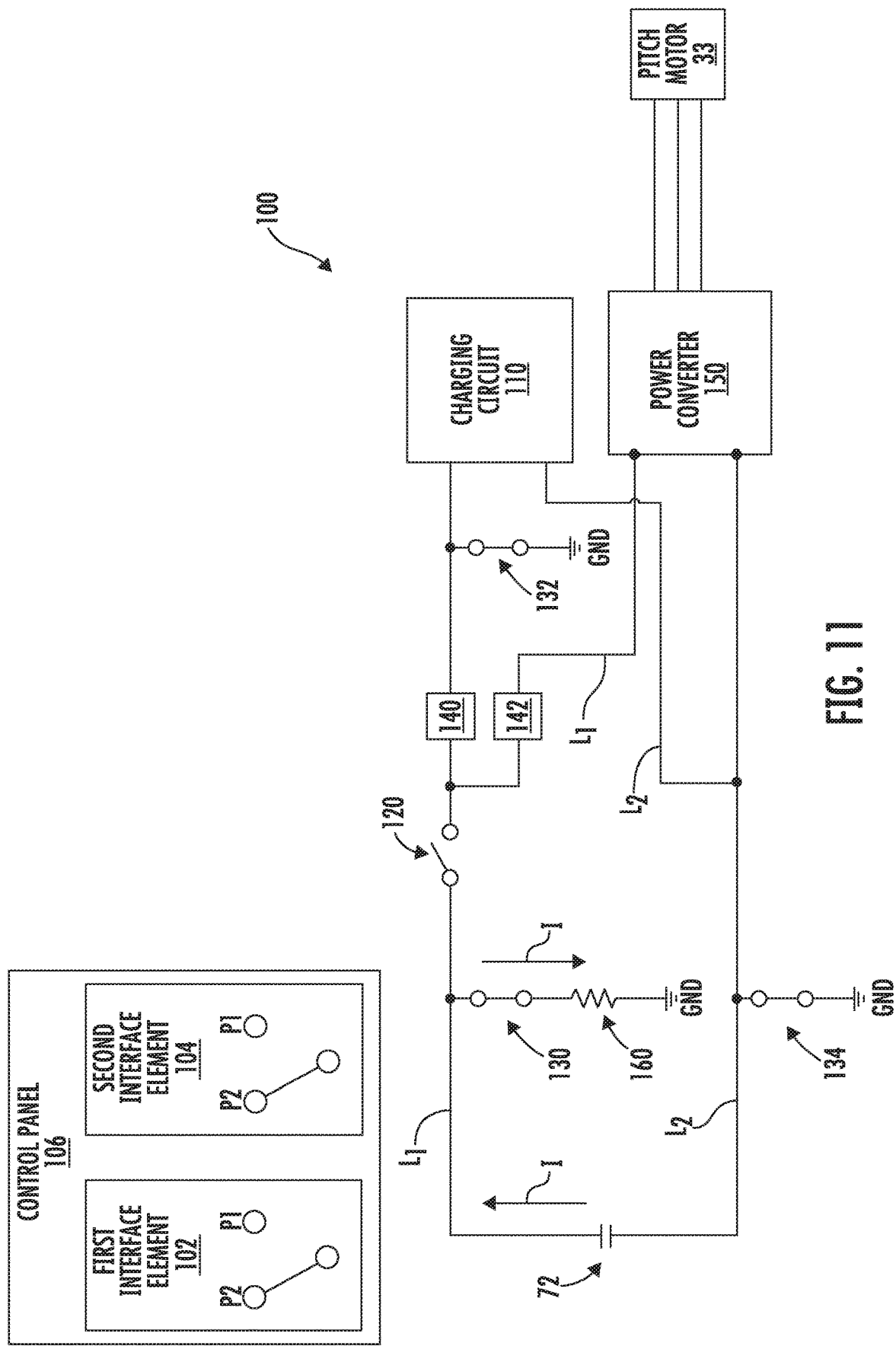
FIG. 11 depicts the grounding circuit of FIG. 9 when the first interface element is in the second state and the second interface element is in a second state according to example embodiments of the present disclosure.
Figure 12:
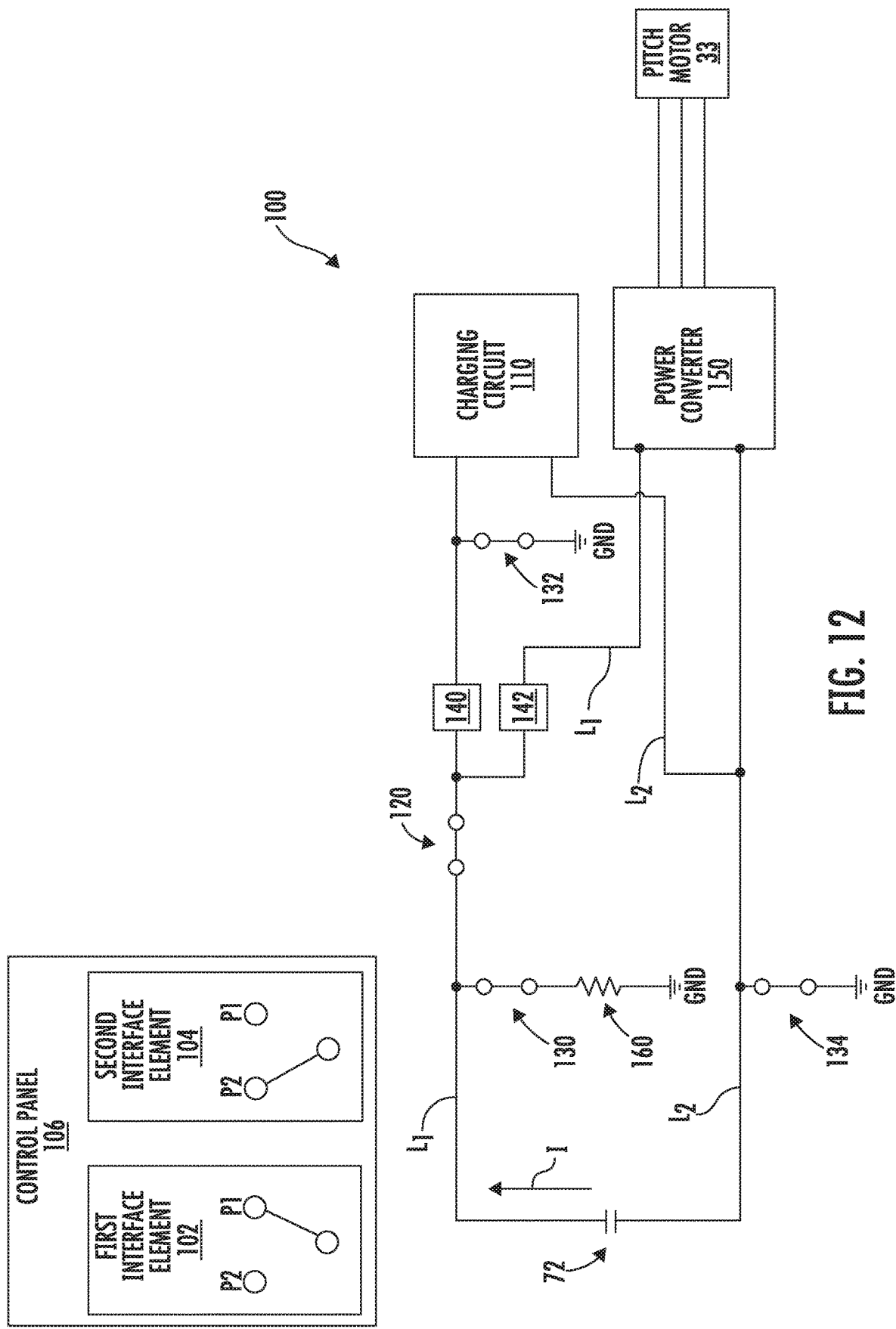
FIG. 12 depicts the grounding circuit of FIG. 9 when the first interface element is in the first state and the second interface element is in the second state according to example embodiments of the present disclosure.
Figure 13:
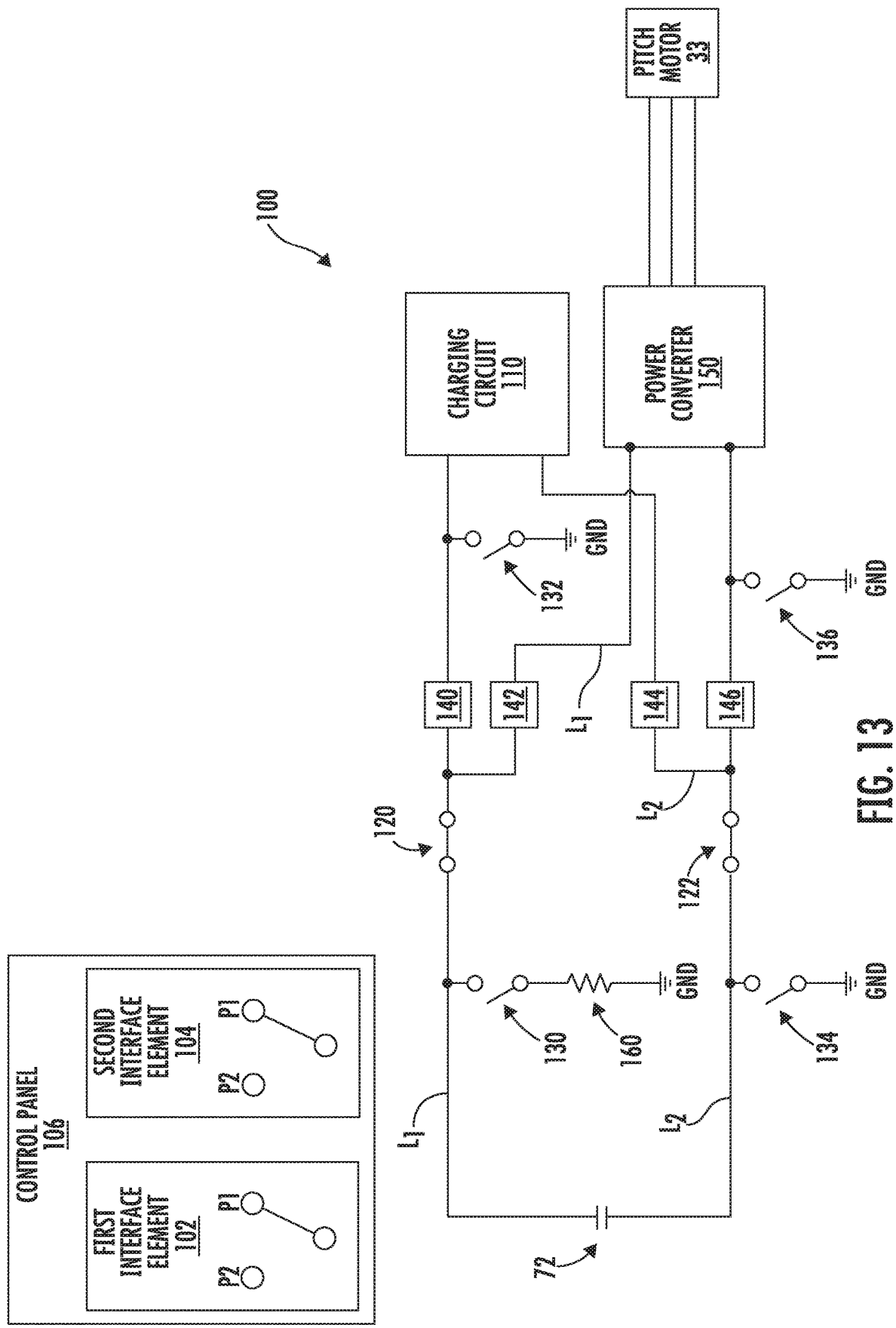
FIG. 13 depicts yet another grounding circuit for an ultracapacitor according to example embodiments of the present disclosure.
Figure 14:
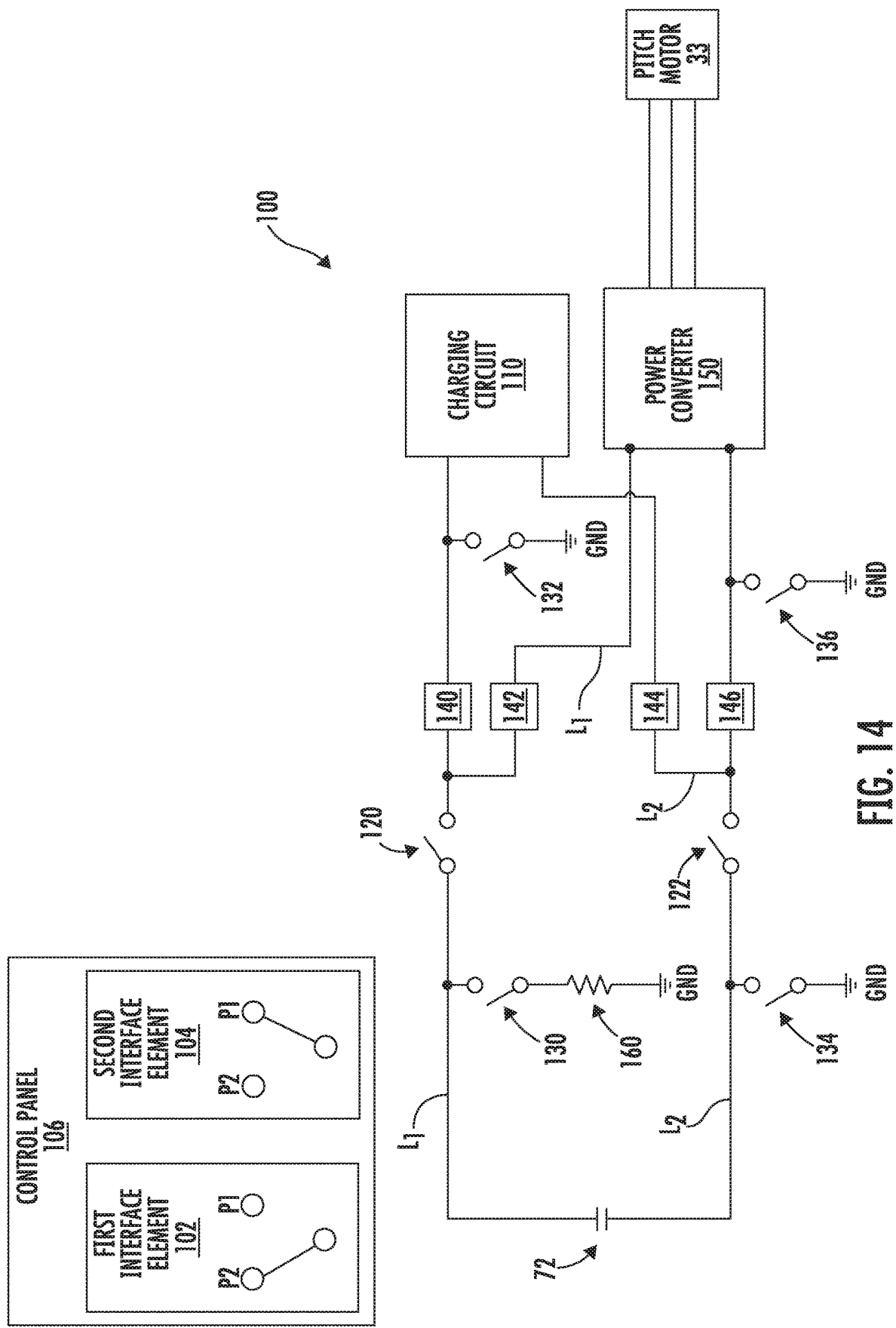
FIG. 14 depicts the grounding circuit of FIG. 13 when a first interface element is in a second state and a second interface element is in a first state.
Figure 15:
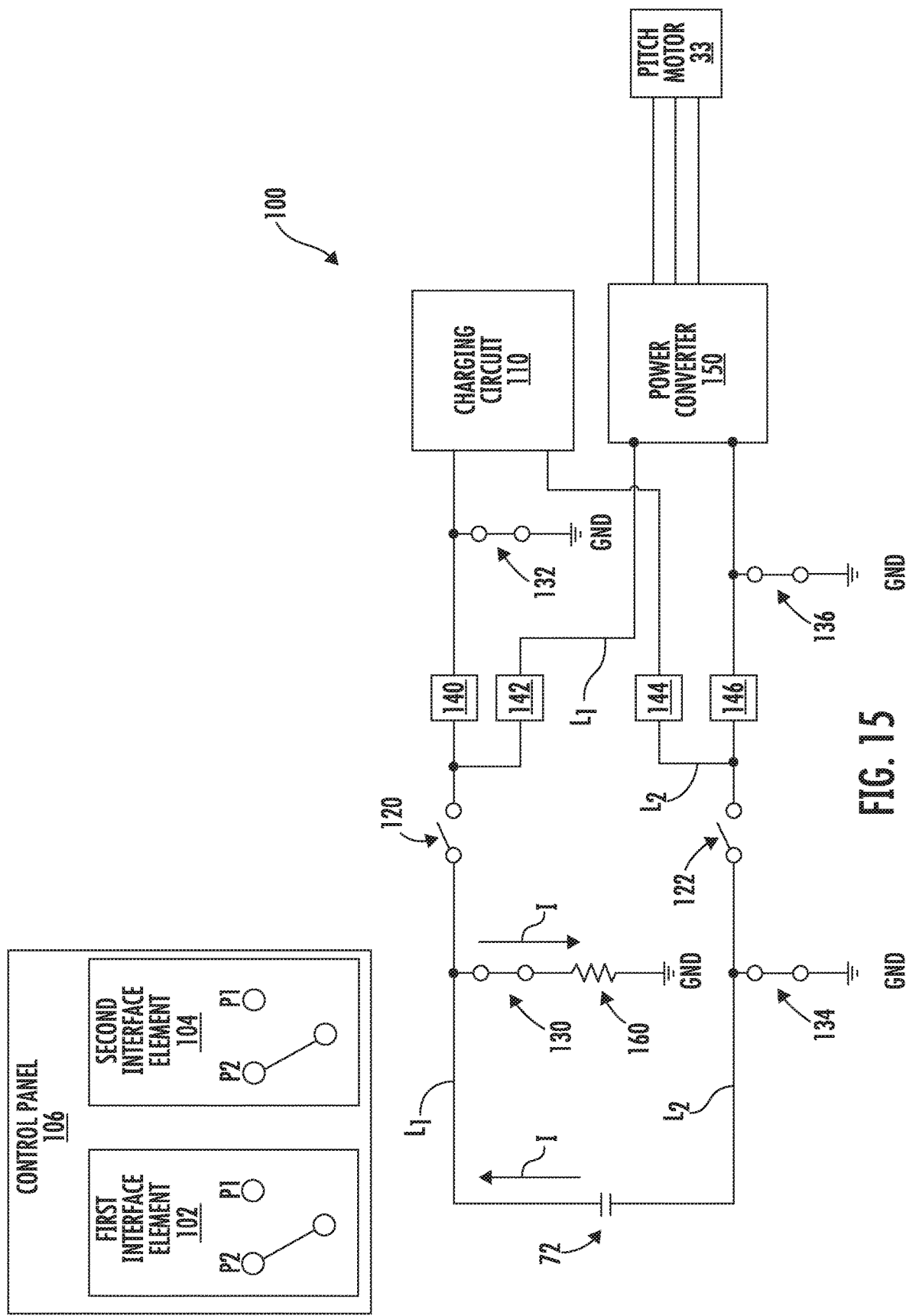
FIG. 15 depicts the grounding circuit of FIG. 13 when the first interface element is in a second state and the second interface element is in a second state according to example embodiments of the present disclosure.
Figure 16:
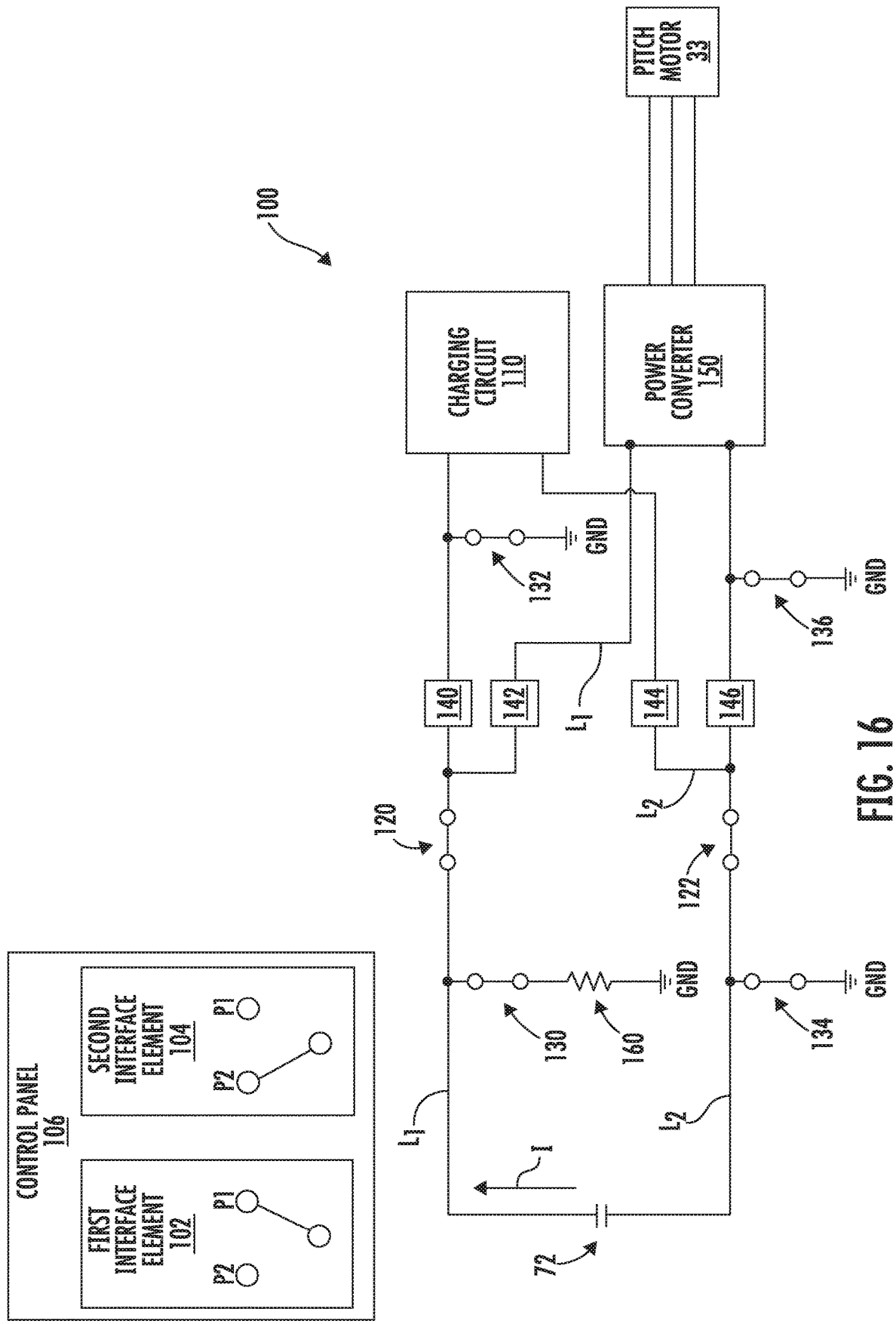
FIG. 16 depicts the grounding circuit of FIG. 13 when the first interface element is in the first state and the second interface element is in the second state according to example embodiments of the present disclosure.

As shown, each of the first switching element 130, second switching element 132, and third switching element 134 is movable between an open position (FIGS. 5 and 6) and a closed position (FIGS. 7 and 8) to selectively couple the ultracapacitor 72 to ground GND. In example embodiments, the first switching element 130 can be coupled to ground GND and the first leg $L_1$ of the ultracapacitor 72. The second switching element 132 can be coupled to ground GND and the first leg $L_1$ of the ultracapacitor 72. The third switching element 134 can be coupled to a second leg $L_2$ of the ultracapacitor 72 and ground GND. As will be discussed below in more detail, each of the switching elements 130, 132, 134 can move from the open position to the closed position, or vice versa, based on a state (e.g., first state P1 or second state P2) of the second interface element 104.

When the second interface element 104 is in the first state P1 (FIGS. 5 and 6), each of the switching elements 130, 132, 134 move to the open position (FIGS. 5 and 6) to decouple the ultracapacitor 72 from ground GND. In contrast, when the second interface element 104 is in the second state P2 (FIGS. 7 and 8), each of the switching elements 130, 132, 134 move to the closed position (FIGS. 7 and 8) to couple the ultracapacitor 72 to ground GND. In this manner, the ultracapacitor 72 can be selectively coupled to ground GND based, at least in part, on the state (e.g., first state P1 or second state P2) of the second interface element 104.

When a maintenance action needs to be performed on the wind turbine 10 (FIG. 1), a user (e.g., maintenance personnel) can operate the first interface element 102 and the second interface element 104 in a predefined sequence to properly ground the ultracapacitor 72. First, the user can provide an input to cause the first interface element 102 to transition from the first state P1 (FIG. 5) to the second state P2 (FIG. 6). For instance, if the first interface element is a switch, the input can include moving the switch from a first position to a second position. In response to the first interface element 102 transitioning from the first state P1 (FIG. 5) to the second state P2 (FIG. 6), the fifth switching element 120 configured to selectively couple the ultracapacitor 72 to the charging circuit 110 can move from the closed position (FIG. 5) to the open position (FIG. 6) to decouple the ultracapacitor 72 from the charging circuit 110 and the power converter 150.

Next, the user can provide an input to cause the second interface element 104 to transition from the first state P1 (FIG. 6) to the second position (FIG. 7). In response to the second interface element 104 transitioning from the first state P1 (FIGS. 5 and 6) to the second state P2 (FIG. 7), each of the first, second, and third switching elements 130, 132, 134 configured to selectively couple the ultracapacitor 72 to ground GND can move from the open position (FIG. 6) to the closed position (FIG. 7) to couple the ultracapacitor 72 to ground GND.

In some embodiments, the grounding circuit 100 can include a resistor 160 coupled between ground GND and the first switching element 130 configured to selectively couple the ultracapacitor 72 to ground GND. As such, when the ultracapacitor 72 is decoupled from the charging circuit 110 and power converter 150 and subsequently coupled to ground GND, the ultracapacitor 72 discharges a current I through the resistor 160 of the grounding circuit 100. In alternative embodiments, the grounding circuit 100 may not include the resistor 160 coupled between ground GND and the first switching element 130 configured to selectively couple the ultracapacitor 72 to ground GND.

When the user does not manipulate the first interface element 102 and second interface element 104 in the predefined sequence, the current I the ultracapacitor 72 discharges when initially coupled to ground GND can potentially damage the charging circuit 110. In order to prevent such damage to the charging circuit 110, the grounding circuit 100 can include a circuit protection device 140 (e.g., fuse) configured to decouple the ultracapacitor 72 from the charging circuit 110. In example embodiments, the circuit protection device 140 can be a fuse coupled between the ultracapacitor 72 and the charging circuit 110. More specifically, the circuit protection device 140 can be coupled to the first leg $L_1$ of the ultracapacitor 72 between the charging circuit 110 and the fifth switching element 120 configured to selectively couple the ultracapacitor 72 to the charging circuit 110. In example embodiments, the circuit protection device 140 (e.g., fuse) can blow when the first interface element 102 and the second interface element 104 are operated out-of-sequence. In this manner, the charging circuit 110 can be isolated from the current I the ultracapacitor 72 discharged when initially coupled to ground GND.

Referring now to FIGS. 9-12, a schematic of another embodiment of the grounding circuit 100 is provided. The grounding circuit 100 of FIGS. 9-12 can be configured in substantially the same manner as the grounding circuit 100 of FIGS. 5-8. However, unlike the grounding circuit 100 of FIGS. 5-8, the grounding circuit 100 of FIGS. 9-12 includes a second circuit protection device 142. As shown, the second circuit protection device 142 can be coupled between the ultracapacitor 72 and the power converter 150. More specifically, the second circuit protection device 142 can be coupled to the first leg $L_1$ of the ultracapacitor 72 between the power converter 150 and the fifth switching element 120 configured to selectively couple the ultracapacitor 72 to ground GND. It should be appreciated that the second circuit protection device 142 can operate in substantially the same manner as the circuit protection device 140 discussed above. More specifically, the second circuit protection device 142 can blow when the first and second interface elements 102, 104 are operated out of sequence. In this manner, damage to the power converter 150 due to the first and second interface elements 102, 104 being operated out of sequence can be prevented.

Referring now to FIGS. 13-16, a schematic of yet another embodiment of the grounding circuit 100 is provided. The grounding circuit 100 of FIGS. 13-15 can be configured in substantially the same manner as the grounding circuit 100 of FIGS. 9-12. However, unlike the grounding circuit 100 of FIGS. 9-12, the grounding circuit 100 of FIGS. 13-16 can include a sixth switching element 122 configured to selectively couple the ultracapacitor 72 to the charging circuit 110. It should be appreciated that the sixth switching element 122 can operate in substantially the same manner as the fifth switching element 120 (e.g., first switching element) discussed above with reference to FIGS. 5 through 8. More specifically, the sixth switching element 122 can move from a close position (FIG. 9) to an open position (FIGS. 10 and 11), or vice versa, to selectively couple the ultracapacitor 72 to the charging circuit 110 and the power converter 150.

As shown, the sixth switching element 122 can be coupled to the second leg $L_2$ of the ultracapacitor 72. When the first interface element 102 is in the first state P1 (FIG. 13), switching elements 120, 122 move to the closed position (FIG. 13) to couple both legs $L_1$, $L_2$ of the ultracapacitor 72 to the charging circuit 110 and the power converter 150. When the first interface element 102 is in the second position (FIG. 14), both switching elements 120, 122 move to the open position (FIG. 14) to decouple both legs $L_1$, $L_2$ of the ultracapacitor 72 from the charging circuit 110 and the power converter 150.

As shown, the grounding circuit 100 of FIGS. 13-16 can include a third circuit protection device 144 and a fourth circuit protection device 146. The third circuit protection device 144 can be coupled to the second leg $L_2$ of the ultracapacitor 72 between the charging circuit 110 and the sixth switching element 122 configured to selectively couple the ultracapacitor 72 to the charging circuit 110 and the power converter 150. The fourth circuit protection device 146 can be coupled to the second leg $L_2$ of the ultracapacitor 72 between the power converter 150 and the sixth switching element 122 configured to selectively couple the ultracapacitor 72 to the charging circuit 110 and the power converter 150.

In example embodiments, the grounding circuit 100 of FIGS. 13-16 can include a fourth switching element 136 configured to selectively couple the ultracapacitor 72 to ground GND. It should be appreciated that the first switching element 136 can operated in substantially the same manner as the first, second, and third switch elements 130, 132, 134 discussed above with reference to FIGS. 5-8. More specifically, the fourth switching element 136 can move from an open position (FIGS. 13 and 14) and a closed position (FIGS. 15 and 16), or vice versa, to selectively couple the ultracapacitor 72 to ground GND.

As shown, the fourth switching element 136 can be coupled to the second leg $L_2$ of the ultracapacitor 72 and ground GND. More specifically, the fourth switching element 136 can be coupled to the second leg $L_2$ of the ultracapacitor 72 between the fourth circuit protection device 144 and the power converter 150. In example embodiments, the fourth switching element 136 can move from the open position and the closed position, or vice versa, to selectively couple the second leg $L_2$ of the ultracapacitor 72 to ground GND.

Figure 17:
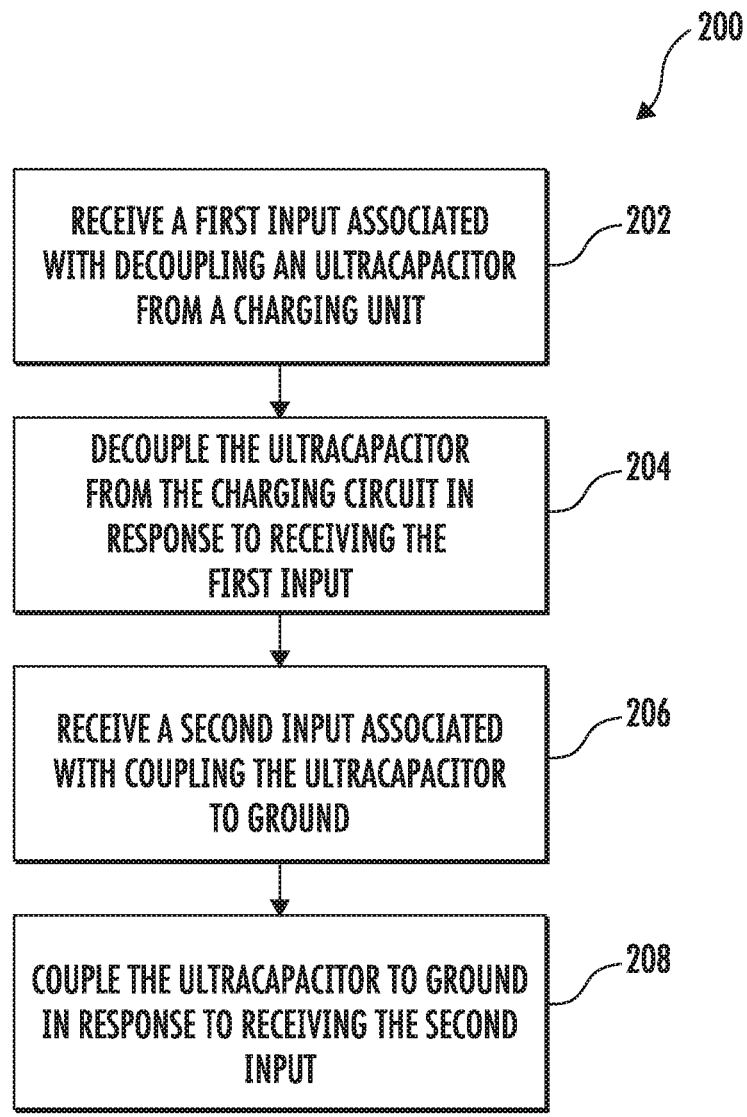
FIG. 17 depicts a flow diagram of a method according to example embodiments of the present disclosure.

Referring now to FIG. 17, a flow diagram of a method 200 for grounding an ultracapacitor used to power pitch motors of a pitch system for a wind turbine is provided according to example embodiments of the present disclosure. It should be appreciated that the method 200 can be implemented using the grounding circuit discussed above with reference to FIGS. 5-16.

At (202), the method 200 includes receiving, at a first interface element of the grounding circuit, a first input associated with decoupling an ultracapacitor from a charging circuit. In example embodiments, the first interface element is a switch movable between at least a first position and a second position to selectively couple the ultracapacitor to the charging circuit. When the switch is in the first position, one or more switching elements (e.g., contactors) of the grounding circuit can move to a closed position to couple the ultracapacitor to the charging circuit. When the switch is in the second position, the one or more switching elements of the grounding circuit can move to the open position to decouple the ultracapacitor from the charging circuit. As such, the first input can be associated with moving the switch from the first position to the second position to decouple the ultracapacitor from the charging circuit.

In some embodiments, a lockout tagout procedure may be implemented to decouple the ultracapacitor from the charging circuit. For instance, the switch may be locked in the first position via a locking mechanism (e.g., padlock) configured to prevent movement of the switch between the first position and the second position. As such, a user must remove (e.g., unlock) the locking mechanism in order to move the switch to the second position to decouple the ultracapacitor from the charging circuit.

At (204), the method 200 includes decoupling, via the one or more switching elements of the grounding circuit, the ultracapacitor from the charging circuit in response to receiving the first input. In example embodiments, the one or more switching elements can move from the closed position to the open position to decouple the ultracapacitor from the charging circuit.

At (206), the method 200 includes receiving, at a second interface element, a second input associated with coupling the ultracapacitor to ground. In example embodiments, the second interface element can be a switch movable between at least a first position and a second position to selectively couple the ultracapacitor to ground. When the switch is in the first position, one or more switching elements of the grounding circuit can move to an open position to decouple the ultracapacitor from ground. When the switch is in the second position, the one or more switching elements of the. As such, the second input can be associated with moving the switch from the first position to the second position to couple the ultracapacitor to ground.

At (208), the method 200 includes coupling, via one or more switching elements of the grounding circuit, the ultracapacitor to ground. In example embodiments, the one or more switching elements can move from the open position to the closed position to couple the ultracapacitor to ground. In example embodiments, the ultracapacitor can discharge through a resistor of the grounding circuit. More specifically, the resistor can be coupled between ground and one of the switching elements configured to selectively couple the ultracapacitor to ground.

It should be appreciated that an amount of time the ultracapacitor requires to discharge can be less compared to the amount of time conventional capacitors require to discharge. In this manner, an amount of time the user (e.g., maintenance person) must wait before performing maintenance on the ultracapacitor or other suitable components of the wind turbine can be reduced.

In some implementations, the first interface element and the second interface element may be operated out-of-sequence. For instance, user-manipulation of the second interface element may occur prior to user-manipulation of the second interface element such that the second input at (206) is received before the first input at (202). However, as mentioned, the grounding circuit includes at least one circuit protection device (e.g., fuse) configured to decouple the ultracapacitor from the charging circuit when the first interface element and the second interface element are operated out-of-sequence. As such, the method 200 includes decoupling, via a circuit protection device of the grounding circuit, the ultracapacitor from the charging circuit when the first interface element and the second interface element are operated out-of-sequence such the second input at (206) is received before the first input at (202). In this manner, the circuit protection device of the grounding circuit safeguards against the user operating the interface elements out-of-sequence.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A grounding circuit for a backup power source for a pitch motor of a pitch system in a wind turbine, the grounding circuit comprising:
    one or more switching elements configured to selectively couple the backup power source to a charging circuit based on a state of a first interface element, the first interface element comprising a switch movable between at least a first position and a second position to selectively couple the backup power source to the charging circuit;
    one or more switching elements configured to selectively couple the backup power source to ground based on a state of a second interface element, the second interface element comprising a switch movable between at least a first position and a second position to selectively couple the backup power source to ground; and
    at least one circuit protection device coupled between the backup power source and the charging circuit,
    wherein when the backup power source is coupled to the charging circuit and subsequently coupled to ground, the at least one circuit protection device is configured to decouple the backup power source from the charging circuit.

2. The grounding circuit of claim 1, wherein when the first interface element is in a first state, the one or more switching elements configured to selectively couple the backup power source to the charging circuit move to a closed position to couple the backup power source to the charging circuit, and wherein when the first interface element is in a second state, the one or more switching elements configured to selectively couple the backup power source to the charging circuit move to an open position to decouple the backup power source from the charging circuit.

3. The grounding circuit of claim 1, wherein when the second interface element is in a first state, the one or more switching elements configured to selectively couple the backup power source to ground move to an open position to decouple the backup power source from ground, and wherein when the second interface element is in a second state, the one or more switching elements configured to selectively couple the backup power source to ground move to a closed position to couple the backup power source to ground.

4. The grounding circuit of claim 1, further comprising a resistor coupled between ground and one of the switching elements configured to selectively couple the charging circuit to ground.

5. The grounding circuit of claim 4, wherein when the backup power source is decoupled from the charging circuit and subsequently coupled to ground, the backup power source discharges through the resistor.

6. The grounding circuit of claim 1, wherein the one or more switching elements configured to selectively couple the backup power source to ground comprise:
    a first switching element coupled to ground and a first leg of the backup power source;
    a second switching element coupled to ground and the first leg of the backup power source between the at least one circuit protection device and the charging circuit; and
    a third switching element coupled to ground and a second leg of the backup power source.

7. The grounding circuit of claim 6, further comprising a resistor coupled between the first switching element and ground.

8. The grounding circuit of claim 7, wherein when the backup power source is decoupled from the charging circuit and subsequently coupled to ground, the backup power source discharges through the resistor.

9. The grounding circuit of claim 6, wherein the at least one circuit protection device comprises:
    a first circuit protection device coupled between the backup power source and the charging circuit; and
    a second circuit protection device coupled between the backup power source and a power converter configured to convert direct current (DC) power from the backup power source to alternating current (AC) power for the pitch motor.

10. The grounding circuit of claim 9, wherein the one or more switching elements configured to selectively couple the backup power source to the charging circuit comprises:

a fifth switching element coupled to the first leg of the backup power source; and a sixth switching element coupled to the second leg of the backup power source.

11. The grounding circuit of claim 10, wherein the at least one circuit protection device comprises:

a first circuit protection device coupled to the first leg of the backup power source between the charging circuit and the first switching element configured to selectively couple the backup power source to the charging circuit;

a second circuit protection device coupled to the first leg of the backup power source between the power converter and the first switching element configured to the selectively couple the backup power source to the charging circuit;

a third circuit protection device coupled to the second leg of the backup power source between the charging circuit and the second switching element configured to selectively couple the backup power source to the charging circuit; and a fourth circuit protection device coupled to the second leg of the backup power source between the power converter and the second switching element configured to selectively couple the backup power source to the charging circuit.

12. The grounding circuit of claim 11, wherein the one or more switching elements configured to selectively couple the backup power source to ground further comprise a fourth switching element coupled to the second leg of the backup power source between the power converter and the second switching element configured to selectively couple the backup power source to the charging circuit.

13. The grounding circuit of claim 1, wherein the first interface element and the second interface element are associated with a control panel of the wind turbine.

14. A method of grounding an ultracapacitor configured to operate a pitch motor of a pitch system in a wind turbine, the method comprising:

receiving, at a first interface element of a grounding circuit, a first input associated with decoupling the ultracapacitor from a charging circuit, the first interface element comprising a switch movable between at least a first position and a second position to selectively couple the ultracapacitor to the charging circuit;

responsive to receiving the first input, decoupling, by the switch of the first interface element, the ultracapacitor from the charging circuit;

receiving, at a second interface element of the grounding circuit, a second input associated with coupling the ultracapacitor to ground, the second interface element comprising a switch movable between at least a first position and a second position to selectively couple the ultracapacitor to ground; and responsive to receiving the second input, coupling, by the switch of the second interface element, the ultracapacitor to ground.

15. The method of claim 14, wherein when receiving the second input occurs prior to receiving the first input, the method further comprises decoupling, by a circuit protection device of the grounding circuit, the ultracapacitor from the charging circuit.

16. The method of claim 14, wherein coupling the ultracapacitor to ground comprises discharging the ultracapacitor through a resistor coupled between ground and one of the switching elements configured to couple the ultracapacitor to ground.

17. A wind turbine, comprising:

a pitch system comprising one or more pitch motors;

an ultracapacitor configured to power the one or more pitch motors; and a grounding circuit for the ultracapacitor, the grounding circuit comprising:

one or more switching elements configured to selectively couple the ultracapacitor to a charging circuit based on a state of a first interface element, the first interface element comprising a switch movable between at least a first position and a second position to selectively couple the ultracapacitor to the charging circuit;

one or more switching elements configured to selectively couple the ultracapacitor to ground based on a state of a second interface element, the second interface element comprising a switch movable between at least a first position and a second position to selectively couple the ultracapacitor to ground; and at least one circuit protection device coupled between the ultracapacitor and the charging circuit, wherein when the ultracapacitor is coupled to the charging circuit and subsequently coupled to ground, the at least one circuit protection device is configured to decouple the ultracapacitor from the charging circuit.

18. The wind turbine of claim 17, further comprising a resistor coupled between ground and one of the switching elements configured to selectively couple the charging circuit to ground.

* * * * *